United States Patent
Kendall

[15] 3,692,330
[45] Sept. 19, 1972

[54] VERTICALLY ADJUSTABLE TWO BAR ASSEMBLY

[72] Inventor: Ray E. Kendall, Box 1042, Alamogordo, N. Mex. 88310

[22] Filed: June 11, 1971

[21] Appl. No.: 152,234

[52] U.S. Cl. .............................. 280/402, 280/490 R
[51] Int. Cl. ............................................. B60p 3/06
[58] Field of Search ............. 280/402, 490; 214/86 A

[56] References Cited

UNITED STATES PATENTS

| | | |
|---|---|---|
| 2,833,430 | 5/1958 | Collins .................... 214/86 A |
| 3,269,751 | 8/1966 | Whattoff ............ 280/490 R X |
| 3,400,949 | 9/1968 | Kendall ................. 280/490 R |

FOREIGN PATENTS OR APPLICATIONS 926,224  4/1955  Germany................... 280/402

Primary Examiner—Leo Friaglia
Attorney—Richard A. Bachard

[57] ABSTRACT

A tow bar assembly for towing one vehicle by another which enables the towed vehicle to be carried at a predetermined or desired height above the ground, including a mounting plate having affixed thereto outwardly extending L-shaped brackets, each having a plurality of equally sized and spaced holes formed along a surface parallel to the surface of the mounting plate. A first wedge having a plurality of pins extending from it to engage selected ones of the holes in the brackets is provided together with a second wedge to maintain the interfitting engagement relationship of the pins in the holes, the second wedge jamming between the first wedge and the mounting plate. A tow bar, including a socket to receive a towing ball carried by a second vehicle, is mounted on the first wedge extending in the general direction of the pins, but is mounted at an angle with respect to a perpendicular to the surface of the first wedge of between about 5° and 25°, to enable the tow bar to be disposed substantially parallel to the ground when in connection with the towing ball, but enabling the towed vehicle to be carried at a desired height off the ground.

11 Claims, 4 Drawing Figures

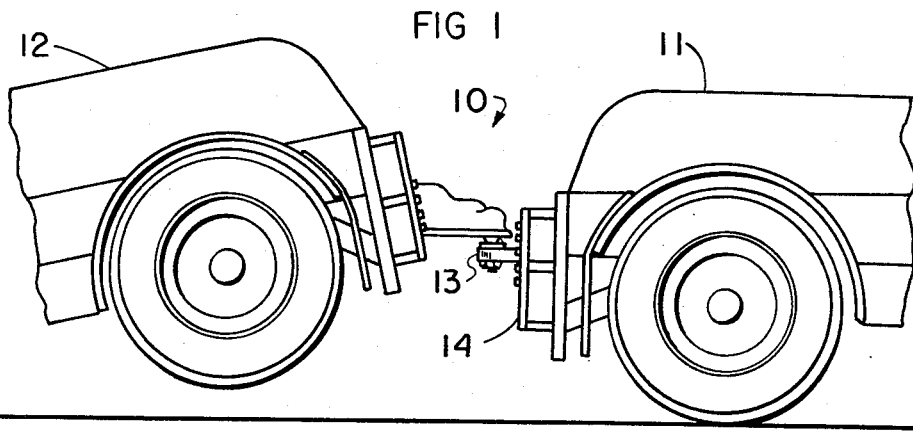
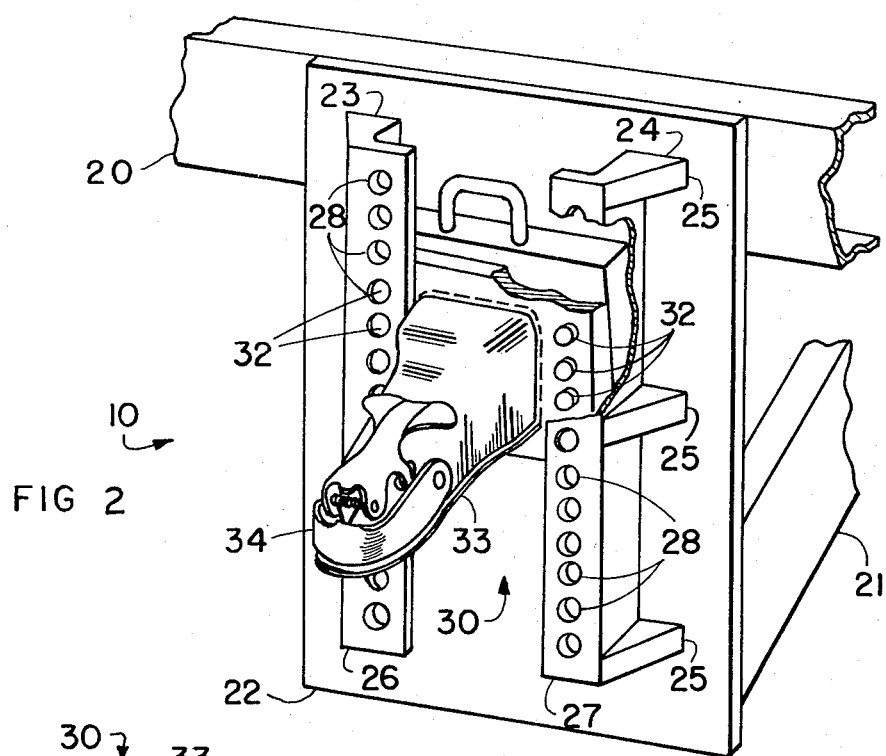
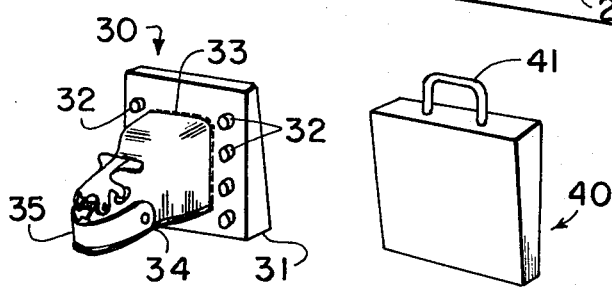
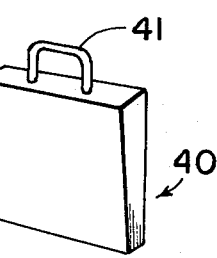
Ray E. Kendall
INVENTOR
BY Richard L. Bachand
ATTORNEY

VERTICALLY ADJUSTABLE TWO BAR ASSEMBLY

BACKGROUND OF THE INVENTION

1. Field of The Invention

This invention relates to improvements in vehicular towing apparatus, and, more particularly, to an improved tow bar for towing one vehicle by another.

2. Description of The Prior Art

Widely used today are towing apparatuses for pulling or hauling one movable object by another; for example, hitches and the like are widely available for pulling housetrailers or other rolling stock by car, truck, or other vehicle. Most of such hitches include a ball or ball assembly which is generally attached to the towing vehicle, and a ball receptacle which frequently may comprise a part of a tow bar or tow bar assembly or the like, attached generally to the towed vehicle or trailer.

Most of the towing apparatus used today for towing, as described, are not of adjustable nature; however, becoming of increased use are trailer hitches or towing apparatus which are either vertically or horizontally adjustable, to respectively allow the height at which the tow bar of the towed vehicle may be adjusted, or allow the distance at which the towed vehicle is maintained from the towing vehicle. For example, the inventor herein has previously advanced a trailer hitch patented in U.S. Pat. No. 3,400,949, which is vertically adjustable to facilitate up and down adjustment, as aforesaid.

That hitch, which may be used in conjunction with the present invention, includes a vertical mounting plate which may be bolted or welded onto one of the vehicles, preferably the towing truck. Two outstanding brackets are provided, each presenting a surface parallel to the surface of the vertical mounting plate, each also having a plurality of holes formed in the parallel surface along its length. The ball portion of the hitch is mounted upon a first wedge which loosely interfits the brackets and the vertical mounting plate. The first wedge also includes a plurality of pins extending outwardly from it in the same direction as the ball and which fit into any desired set of holes along the brackets, thereby allowing the ball assembly to be placed at any desired vertical height. A second wedge is also provided which may be inserted between the first wedge ball assembly and the vertical plate to force the first wedge outwardly from the vertical plate to hold the pins of the ball assembly in mating relationship with the holes of the brackets.

In the use and operation of this and similar hitches, a tow bar, usually attached to the object towed, including a ball receiving receptacle, is placed in connection with the ball of the ball assembly. The tow bar is usually rigidly attached to the towed vehicle; although it may be bolted and often it is permanently welded thereto. Thus, in cases involving trailers and the like, any required vertical adjustment may be obtainable with such vertically adjustable hitch in connection with such rigid tow bars.

However, frequently, especially when numbers of trailers are towed from one location to another in a convoy, to return the trucks to their starting point, one truck is frequently used to tow another, for economy in gas, wear and tear, and for reaching the driver's convenience. Usually, the back end of the towed vehicle is raised to be towed with the drive wheels off the ground so that no rotary motion will go through the gearbox and drive train of the towed truck as it is being hauled, thereby eliminating much wear to the towed truck over the many towed miles. Thus, tow bars used in the past were required to be so rigidly attached to the towed truck to enable it to be held off the ground, as described, and also to be strong enough to haul the towed truck, in such elevated position, to allow it to be pulled as desired. It can be seen that permanently and rigidly attaching such tow bar to the towed truck can be cumbersome, and may interfere with any subsequent towing process in which the towed truck becomes again a towing truck upon reachin the destination, unless the rigidly attached tow bar is somehow removably fastened to the towing truck. In fact, it has been found so difficult and bothersome to attach tow bars of such fixed nature, that frequently the back end of the towed truck is physically lifted over the rear of the towing truck and carried over its fifth wheel.

BRIEF DESCRIPTION OF THE INVENTION

In light of the above, therefore, it is an object of the invention to provide a tow bar which may be removably attached to a towed vehicle, and which may be used to support the towed vehicle with selected ones of its wheels off the ground.

It is a further object of the invention to provide a tow bar which will not interfere with subsequent towing processes if the towed vehicle is later used as a towing vehicle.

It is another object of the invention to provide a tow bar usable in conjunction with vertically adjustable hitches.

These and other objects, features, and advantages will become apparent to those skilled in the art from the following detailed description, when read in conjunction with the appended claims and accompanying drawing.

In accordance with the invention, in its broad aspect, a vertically adjustable tow bar assembly is provided which includes a mounting plate vertically mountable onto a vehicle. The mounting plate has affixed to the side opposite that upon which it is mounted, two brackets side by side to and outstanding from the mounting plate, each bracket presenting a surface parallel to the mounting plate and having formed therein a plurality of equally sized and spaced holes. A first wedge is also provided which is fittable between the surfaces of the two brackets and the mounting plate. Extending outwardly from the first wedge are a plurality of pins which are spaced and sized to be insertable into selected ones of the plurality of holes in the mounting brackets. To maintain the pins in the selected holes, a second wedge is provided which is fittable between the first wedge and the mounting plate. A tow bar for connection to a towing ball is mounted on the first wedge to extend therefrom in the same general direction as the direction of the plurality of pins. The tow bar is disposed however, at a downward angle from the normal to the surface of the wedge to enable the vehicles on which the tow bar assembly is mounted to be carried at a pre-determined height above the ground with the base of the tow bar essentially parallel to the ground.

BRIEF DESCRIPTION OF THE DRAWING

The invention is illustrated in the accompanying drawing, wherein:

FIG. 1 is a side view of a first vehicle towing a second, utilizing the tow bar assembly of the invention.

FIG. 2 is a perspective view, partially cut away, of the tow bar assembly of the invention.

FIG. 3 is a perspective view of the tow bar mount used in conjunction with the tow bar assembly of FIG. 2.

And FIG. 4 is a perspective of the position maintaining wedge used in conjunction with the tow bar assembly of FIG. 2.

Throughout the drawing and subsequent description, in reference to the figures of the drawing, it is understood that like reference numerals indicate like parts. It should also be understood various ones of the illustrated parts have been exaggerated for clarity and ease of description.

DETAILED DESCRIPTION OF THE INVENTION

As mentioned above, the tow bar assembly of the invention is intended for use in towing one vehicle by another. As shown in FIG. 1, the tow bar assembly, generally denoted by the reference number 10, may interconnect a first vehicle 11 and a second vehicle 12. Mounted on the first vehicle 11 is a ball member 13, which may be a part of a vertically adjustable hitch 14. The tow bar assembly 10 is configured to enable the towed vehicle 12 to be carried with its wheels adjacent the towing vehicle off the ground, as illustrated, to reduce the wear upon the drive chain, wheels, and transmission which would occur if they were allowed to run on the ground during towing. The particular height at which the wheels are carried may be easily adjusted to any desired position, as below described.

The tow bar assembly 10 of the towed vehicle, the details of which are shown in FIG. 2, may be mounted upon the towed vehicle by mounting it on the rear frame, or as shown, upon supporting braces 20 and 21 of the towed truck 12 (shown in FIG. 1). The tow bar assembly 10 is based upon a vertical mounting plate 22, of steel or other strong material, which serves to mount the tow bar assembly to the truck 12 and to support the other members of the tow bar assembly. Outstanding upon the mounting plate 22 are two L-shaped brackets 23 and 24, respectively, which may be assembled of two flat pieces of metal welded into the required L-shape; alternatively, they may be cast as a single piece, as shown. To strengthen the bond made at the junction between the L-shaped brackets 23 and 24, several angle or brace pieces 25 may be provided upon which additional welds may be made to the mounting. Such brace pieces 25 may conveniently be cast as a part of the casting process in forming the brackets 23 and 24. Thus, the mounting brackets 23 and 24 present substantially along the length of the mounting plate 22, two surfaces 26 and 27 which are parallel to the mounting plate 22, but displaced outwardly from it in the direction toward the towing vehicle 11, or away from the vehicle 12 upon which the tow bar is mounted.

Along the length of these outstanding surfaces, a plurality of holes 28 is formed, the holes 28 being located at various equally spaced intervals. These holes may conveniently be formed in the casting process, or, alternatively, may be simply drilled through the surfaces at the desired locations.

Disposed within the space between the outstanding members and the mounting plate 22 is a tow bar mount 30, particularly shown in FIG. 3. The tow bar mount 30 includes a mounting plate 31 of general wedge shape, the larger end of the wedge being downwardly oriented. A plurality of pins 32 is provided upon the mounting plate 31, each of diameter slightly smaller than the diameter of the holes 28 in the outstanding surfaces 26 and 27, and of approximately the same spacing as the holes 28. The pins 32 may be welded onto the surface of the mounting plate 31, or they may be conveniently made as a part of a casting process in the formation of the rigid material of the mounting plate 31.

Also welded by welds 33 to the mounting plate 31 is a tow bar tongue 34 which includes a ball receiving receptacle (downwardly disposed and not shown). The tow bar tongue 34 being of standard design widely commercially available, and not described herein in detail, has, in addition to the ball receiving receptacle, means for securing the towing ball within the receiving receptacle, such means being denoted by the reference number 35.

The tow bar tongue 34, however, rather than being affixed to the towed vehicle, as usual, is welded to the mounting plate or wedge 31. Also, rather than being affixed at the normal perpendicular angle, it is disposed at a downwardly extending angle of between 5° and 25°, perhaps conveniently of 15° or more to facilitate the raising of the wheels of the towed vehicle off the ground, as mentioned above. The precise angle required will depend, of course, upon the type of vehicle towed; the farther from the end of the vehicle its wheels are located, the larger the angle required to raise them off the ground. It is desirable to choose an angle for mounting the tow bar tongue such that when the towed vehicle is carried at the desired height above the ground, the tow bar tongue itself is substantially parallel to the ground. Thus, with the tow bar tongue so disposed, the towing ball will be free to move in any lateral rotational position within the socket of the tow bar tongue without binding or interferring with turning operations with respect to the towed and towing vehicles.

The tow bar mount, thus described, is then carried upon the mounting plate 22 between it and the outstanding surfaces 26 and 27, and is vertically adjustable by locating the pins 32 in any desired ones of the holes 28. For change in height, for example, the entire tow bar mount 30 may be pushed inwardly toward the mounting plate 22 until the pins 32 are out of engagement with the holes 28, and raised or lowered as desired, then pulled away from the mounting plate 22 to allow the pins 32 to re-engage holes 28 at the adjusted height.

To secure the mounting plate 31 in the chosen height position, a wedge 40, shown in FIG. 4, is provided. The wedge 40, opposite from mounting plate 31, has its larger end upwardly oriented, as illustrated, and is of thickness such that the total thickness of the wedge 40 juxtaposed in alignment with the mounting plate 31 is slightly larger than the distance between the mounting plate 22 and the outstanding surfaces 26 and 27 to allow it to jam against and hold the mounting plate 31 with the pins 32 in engagement with the holes 28. To ease in insertion of the wedge plate 40, a handle 41 is provided on its upward end.

The mounting plate 31 being similar to the plate previously proposed by the inventor, above-described to carry a towing ball, is compatible with the present invention, and may easily be transformed from a towing vehicle structure to a towed vehicle structure merely by substituting for the ball mount the tow bar tongue, mounted, of course, squarely upon a similar mounting plate 31. Thus, the structure of the invention may be used in conjunction with a ball assembly to tote or haul a trailer or the like to a desired location. Then, by substituting the tow bar assembly for the ball assembly, the truck may be reversed and towed to the original or other destination.

Although the invention has been described and illustrated with a certain degree of particularity, it is understood that the present disclosure has been made only by way of example, and that numerous changes in the details of construction and the combination and arrangement of parts may be resorted to without departing from the spirit and scope of the invention as hereinafter claimed.

What is claimed is:

1. A vertically adjustable tow bar assembly, comprising:
   a mounting plate vertically mountable on a vehicle,
   two brackets affixed side by side to and outstanding from said mounting plate, each presenting a surface parallel to said mounting plate, each of said presented surfaces having therein a plurality of equally sized and spaced holes,
   a first wedge fittable between said presented surfaces and said mounting plate,
   a plurality of pins extending outwardly from said first wedge, said plurality of pins being spaced and sized to be insertable into selected ones of said plurality of holes,
   a second wedge fittable between said first wedge and said mounting plate to force said plurality of pins into said selected holes, and
   a tow bar mounted on said first wedge to extend therefrom in the same general direction as the direction of said plurality of pins being disposed at a downward angle to enable the vehicle on which said tow bar assembly is mounted to be carried at a predetermined height above the ground with the base of said tow bar substantially parallel to the ground.

2. The tow bar assembly of claim 1 wherein said downward angle is between approximately 5° and 25°.

3. The tow bar assembly of claim 1 wherein said downward angle is approximately 15°.

4. The tow bar assembly of claim 2 wherein said tow bar is welded to said first wedge.

5. The tow bar assembly of claim 4 wherein said tow bar comprises means for receiving a towing ball and means for securing said towing ball in said receiving means.

6. A tow bar wedge assembly for use in a vertically adjustable hitch of the type wherein a first wedge having first engagement means is held between a mounting plate and brackets outstanding therefrom having second engagement means, with said first and second engagement means engaged, by a second wedge interfitting said first wedge and said mounting plate, comprising:
   a wedge having front and back faces,
   a plurality of protrusions extending from said wedge to form said first engagement means,
   and a tow bar mounted on the front face of said wedge at a downwardly extending angle from the perpendicular to the front face.

7. The tow bar wedge assembly of claim 6 wherein said plurality of protrusions is a plurality of pins extending from the front face of said wedge.

8. The tow bar wedge assembly of claim 7 wherein said downwardly extending angle is between approximately 5° and 25°.

9. The tow bar assembly of claim 7 wherein said downwardly extending angle is approximately 15°.

10. A vertically adjustable tow bar assembly comprising:
    a plate mountable on the rear of a truck;
    two L-shaped brackets attached to said plate in spaced-apart relationship disposed parallel to each other to define a void area over which portions of said L-shaped brackets overhand, said overhanging portions having a plurality of equally sized and spaced holes therein;
    a first wedge loosely fittable in said void area,
    a plurality of pins spaced upon said first wedge and sized to interfit selected ones of the holes in said overhanging portions;
    a second wedge insertable between said first wedge and said plate to maintain the interfitting relationship of said plurality of pins and the said selected ones of the holes in said overhanging portions, and
    means for receiving a towing ball, being mounted on said first wedge extending in the general direction of said plurality of pins at a downward angle of between approximately 5° and 25° from the normal to the surface of said first wedge whereby said means is disposed approximately parallel to the ground when in connection with the towing ball.

11. The adjustable tow bar of claim 10 wherein said means for receiving a towing ball is a tow bar and further comprising means in said tow bar for securing said towing ball.

* * * * *